Oct. 18, 1966  J. B. SWETT ETAL  3,279,397
COMBINED KITCHEN UTENSIL
Filed May 8, 1964

INVENTORS
JAMES B. SWETT
HENRY J. MARIEN
BY *Harold R. Beck*
ATTORNEY

INVENTORS
JAMES B. SWETT
HENRY J. MARIEN
BY Harold R. Beck
ATTORNEY

United States Patent Office 3,279,397
Patented Oct. 18, 1966

3,279,397
COMBINED KITCHEN UTENSIL
James B. Swett, Barrington, and Henry J. Marien, Warwick, R.I., assignors to Rexall Drug and Chemical Company, Los Angeles, Calif., a corporation of Delaware
Filed May 8, 1964, Ser. No. 369,342
3 Claims. (Cl. 107—47)

This invention generally relates to a kitchen utensil and particularly to a kitchen utensil having combined utility, especially in the preparation of pastry products such as pies and the like.

The over-all object of this invention is to produce a kitchen implement which has several varying utilitarian features and specifically one which will act as a measuring implement, a cookie cutter, a mold for salads and the like, a pastry cutter and a cake and pie edger.

Another object of the present invention is the production of a combined kitchen utensil which is comprised of in part by opposed measuring elements of unequal volumetric capacity which individual elements are generally of equal depth, over-all outer dimension, and which present a generally balanced appearance.

A still further object of the present invention is the provision of a combined kitchen utensil which presents elements of varying perimetrical configuration to serve as cookie cutters and which are formed by converging side wall portions in such a manner so as to increase the strength of the individual containers and prevent the deflection of their walls and to further facilitate the ease in pouring measured liquids and gelled solids from such individual elements.

With the above and other objects in view, as will appear hereinafter, the nature of the invention will be more clearly understood by reference to the following detailed description and the accompanying drawings.

Figure 1:
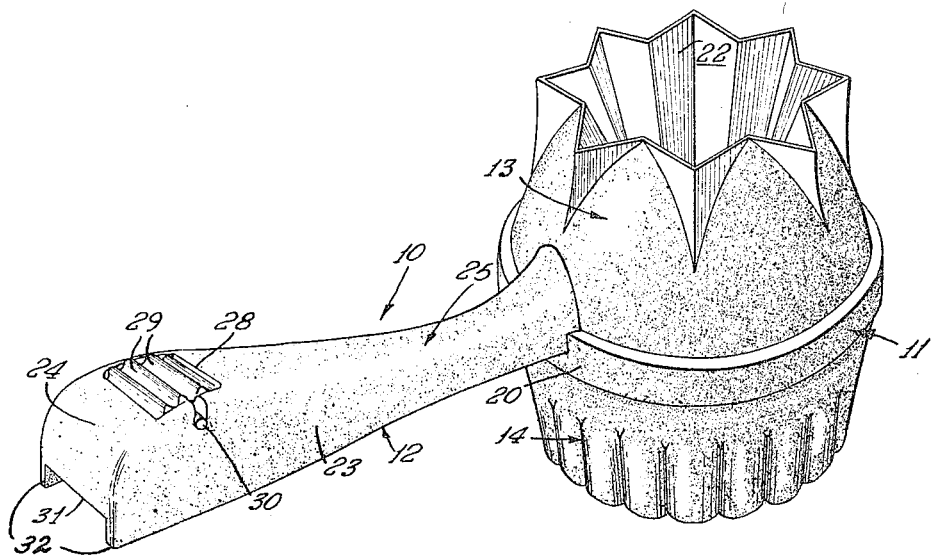
FIGURE 1 is a perspective view of the present combined kitchen utensil showing the cooperation of the constituent portions thereof and its over-all configuration.
Figure 2:
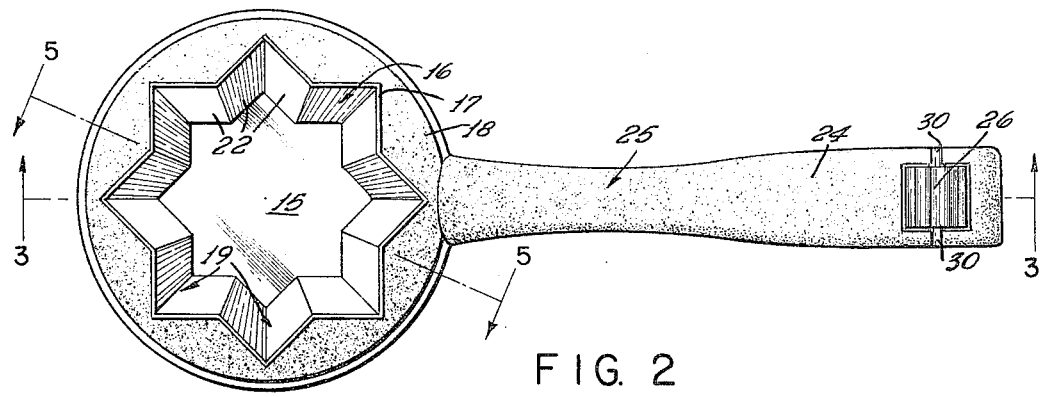
FIGURE 2 is a top plan view of the combined kitchen utensil shown in FIGURE 1.

Referring to the drawings and more particularly to FIGURE 1 thereof, the combined kitchen utensil 10 of the present invention is shown and is generally comprised of a head member 11 having a handle 12 extending generally normal thereto. Head member 11 is composed of elements 13 and 14 which may be either separately formed and then integrally joined or formed integral initially, the former alternative being preferred. Each of the elements 13 and 14 is generally comprised of inner and outer side walls and a bottom wall.

Referring in detail to the upper element 13 as best depicted in FIGURES 1 through 3 and 5 of the drawings, the element 13 forms an enclosed portion cavity 13a suitable for receiving liquids to be measured or as a mold cavity for gelled salads and the like. The cavity 13a is preferably imperforate and is defined at its lower extent by a bottom wall 15. An inner side wall 16 slopes upwardly and outwardly from the periphery of the bottom wall 15 and is integral therewith. This inner side wall 16 terminates in a peripheral edge 17. Downwardly extending from the peripheral edge 17 is an outer side wall 18 which extends downwardly and outwardly therefrom so as to be laterally displaced from the peripheral extent of the bottom wall 15. The free edge of the outer side wall 18 is provided with an outwardly offset rim portion 20 which in part serves as the connecting means by which the opposed elements 13 and 14 are interconnected.

Figure 5:
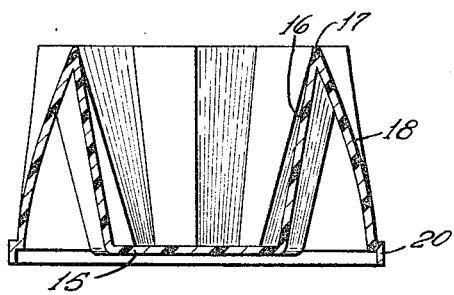
FIGURE 5 is a fragmentary sectional view taken along the line 5—5 of FIGURE 2; and, FIGURE 6 is a fragmentary sectional view taken along the line 6—6 of FIGURE 4.
Figure 3:
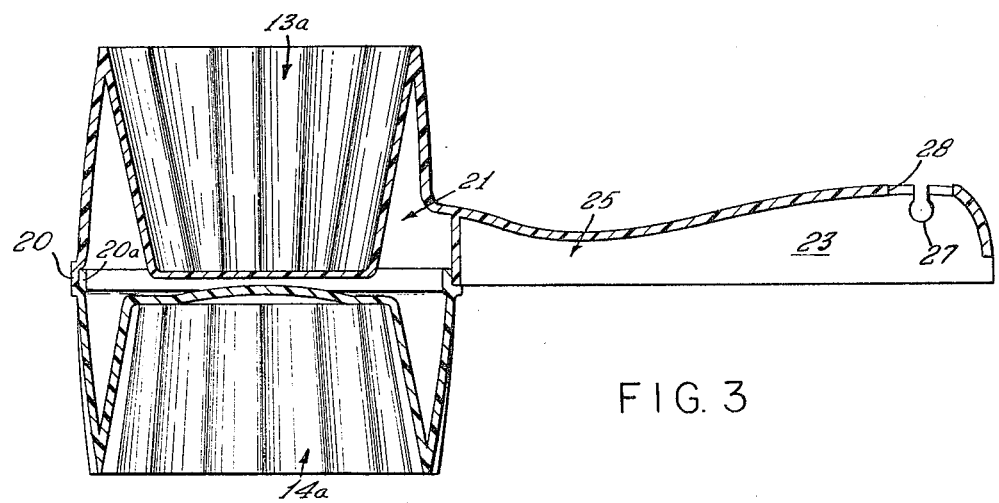
FIGURE 3 is a side elevational view in cross section taken along the line 3—3 of FIGURE 2, the knurled wheel having been removed.
Figure 4:
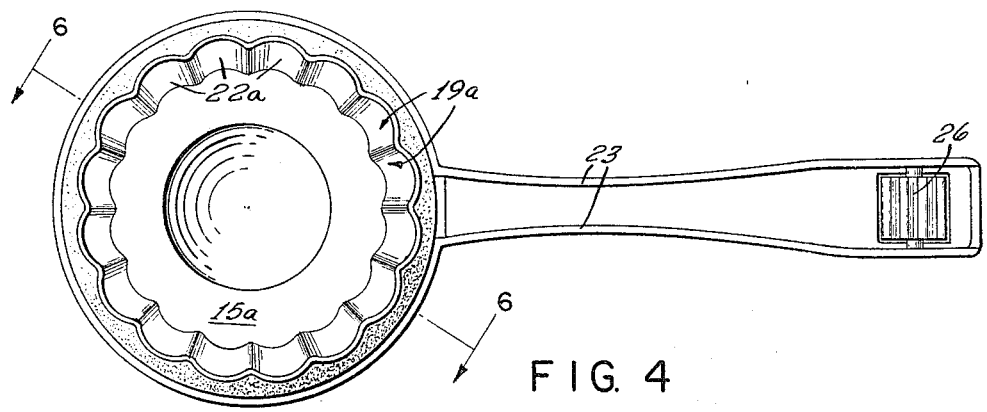
FIGURE 4 is a bottom plan view of the combined kitchen utensil shown in FIGURE 1.
Figure 6:
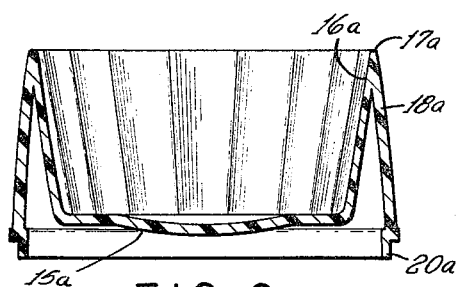

Referring now to FIGURES 1, 4 and 6 of the drawings, the lower element 14 is more clearly shown. The general configuration of this lower element 14 is similar to that of element 13 and comprises a bottom wall 15a which may be centrally depressed and an inner side wall 16a upwardly and outwardly extending therefrom. Inner side wall 16a and bottom wall 15a are integral and wall 16a terminates in a peripheral edge 17a. Integrally connected to the peripheral edge 17a is an outer side wall 18a which downwardly and outwardly extends therefrom and terminates in an inwardly offset rim portion 20a. As can be best seen from FIGURE 3 of the drawings, the offset portions 20 and 20a respectively of elements 13 and 14 are suitably interengaged so as to space the respective bottom walls 15 and 15a of the elements 13 and 14 from each other and in this manner further define the general outer configuration of the head member 11. Thus by providing each of the elements 13 and 14 with side walls which converge along an integral peripheral edge, such elements when interconnected form a hollow compartment 21 therebetween. Thus when the material from which the individual elements 11 and 12 is molded is of a density greater than water, the provision of the hollow compartment 21 permits the combined kitchen utensil 10 to conveniently float in water. Furthermore, the convergence of the side walls of each element to its respective peripheral edge additionally serves to strengthen each element by means of the rigidifying triangular configuration formed by the respective side walls such as best seen in FIGURES 3, 5 and 6. Such construction further enhances the utility of the utensil as a cookie cutter and the like.

It should be noted at this time that the inner side walls 16 and 16a of the elements 13 and 14 respectively are composed of individual longitudinally disposed portions or panels 22 and 22a respectively which respective panels are integral with each other and in side to side abutting relationship and thus define the peripheral configuration of respective edges 17 and 17a. This fluted configuration imparted to elements 13 and 14 by means of the panels 22 and 22a serves to form a plurality of longitudinally disposed channels 19 and 19a respectively by which the pouring of measured liquids and the like is enhanced. The individual side wall panels or flutes 22 and 22a in conjunction with the upward and outward flare of the side walls 16 and 16a further permit the easy removal of the gelled material such as salad molds therefrom. Furthermore, by providing each element with a different peripheral flute-like configuration by varying the shape and angular relationship of the panels 22 and 22a to each other respectively, opposed imperforate containers which both in depth and outward appearance appear to be of approximately equal volumetric measure but which actually are of unequal volumetric measure can be produced without upsetting the basic symmetry of the combined kitchen utensil of the present invention. The disposition of the panels of each element thus in effect defines the appearance of the closed figure defined by a plane passing through one of the elements normal to its longitudinal axis. By varying the area enclosed by such figure the volumetric capacity of the respective elements may be varied.

The handle 12 generally extends normally to the head 11 and is utilized in part as a carrying and manipulating implement therefor. As can best be seen from FIGURE 3 of the drawings, the handle 12 is integral with the uppermost element 13. The handle 12 is comprised of side walls 23 and an upper connecting wall 24 integral therewith. The sidewalls 23 upwardly and outwardly flare from a reinforcing narrow throat portion 25 located proximate to the point at which the handle 12 extends from the element 13. It should be noted that the handle may be affixed or integrally formed with either element 13 or element 14 or a combination of both with accompanying interlocking means therebetween. The upward and sideward flare of the side walls 23 along with the upward and widening flare of the upper connecting wall 24 provides an inherent flexibility to the handle and conveniently positions a knurled wheel 26 in operable position for crimping pie crusts and the like. This knurled wheel 26 is positioned proximate the terminus of the handle 12 and is snap fittingly held by means of an upwardly opening U-shaped slot 27 in each of the side walls 23. The upper connecting wall 24 is also provided with an opening 28 for receipt and elevated exposure of the knurled wheel 26. The knurled wheel 26 is generally cylindrical having peripheral elements 29 for the formation of decorative indentations in pastry and the like. On either side of the knurled wheel 26 there is an axial extension 30 thereby providing the snap fit engagement with the slots 27. The wheel 26 is thus free to rotate on the axial extensions or trunions 30 and to outwardly extend beyond the connecting wall 24 through opening 28. By conveniently placing the palm of ones hand over the element 14 and ones forefinger approximately in the central lower portion of the handle 12, one can with ease manipulate the wheel 26 by moving the utensil 10 along the surface of a pastry strip or the like and form decorative indentations therein. In this manner, the opposite peripheral extent of the element 13 does not interfere with the free operation of the wheel 26.

As can be best seen from FIGURE 1 of the drawings, a recess 31 is provided at the terminus of connecting wall 24 so as to define terminal edge portions 32 which edge portions 32 are in opposed relationship. The thickness of the edge portions 32 is also preferably less than the remaining portions of the side walls 23 and in effect form knife edges whereby pastry and other foodstuffs may be cut in strip form, the width of the strip being determined by the spacing of the side walls 23. Thus the user of the combined kitchen utensil may not only decoratively knurl and indent the surface of pastry and the like but may also form strips to be so decorated from rolled pastry or the like. In addition thereto the opposed elements 13 and 14 are imperforate containers by which various amounts of foodstuffs and the like may be measured during kitchen preparation thereof. The perimetrical configuration of the individual elements formed by the merged edges 17 and 17a define the shape of cookies formed as by dieing out from sheets of pastry or the like.

In view of the foregoing disclosures, variations or modifications thereof will be apparent, and it is thus intended to include within the present invention all such variations and modifications which fall within the scope of the appended claims.

We claim:
1. A multi-use kitchen utensil comprising open-ended generally cup-shaped multi-sided and interrelated elements, each of said elements defined by bottom and side walls, means associated with each of said elements for connecting said elements in interrelated position with each other and with said bottom walls in opposed approximate position to each other, said side and bottom walls of each element defining a separate imperforate container for receipt of foodstuffs and the like, said containers having unequal volumes, the side wall of each element being generally of equal extent so as to define elements of generally equal depth, said side walls further being comprised of a plurality of panels formed integrally along the longitudinal extent of the sides thereof, the panels of each element defining a closed polygon figure in cross section through said side wall and normal to the longitudinal axis of each element, and corresponding figures for each element being of a different shape so that each container although of generally equal depth presents unequal volumetric capacities.

2. The utensil as defined in claim 1 wherein there is provided a handle member integral with the side wall of one of said elements and extending generally normal thereto, said handle terminating in an enlarged portion having separate means for respectively molding and cutting foodstuffs having been measured in one of said aforementioned elements.

3. The utensil as defined in claim 2 wherein said cutting means comprises opposed and recessed separated terminal edge portions of the handle portion distal from said elements.

References Cited by the Examiner

UNITED STATES PATENTS

| | | | |
|---|---|---|---|
| 294,910 | 3/1884 | Praddex | 107—47 |
| 884,767 | 4/1908 | Senseney | 220—20 |
| 1,174,564 | 3/1916 | Golden | 107—48 |
| 1,549,269 | 8/1925 | Koree et al. | 220—16 |
| 2,493,633 | 1/1950 | Mart | 220—9 X |
| 2,497,976 | 2/1950 | Burley. | |
| 2,666,710 | 1/1954 | Peters | 107—19 X |
| 3,074,263 | 1/1963 | Farmer | 68—213 |

WILLIAM. I. PRICE, *Primary Examiner.*